Figure 1:
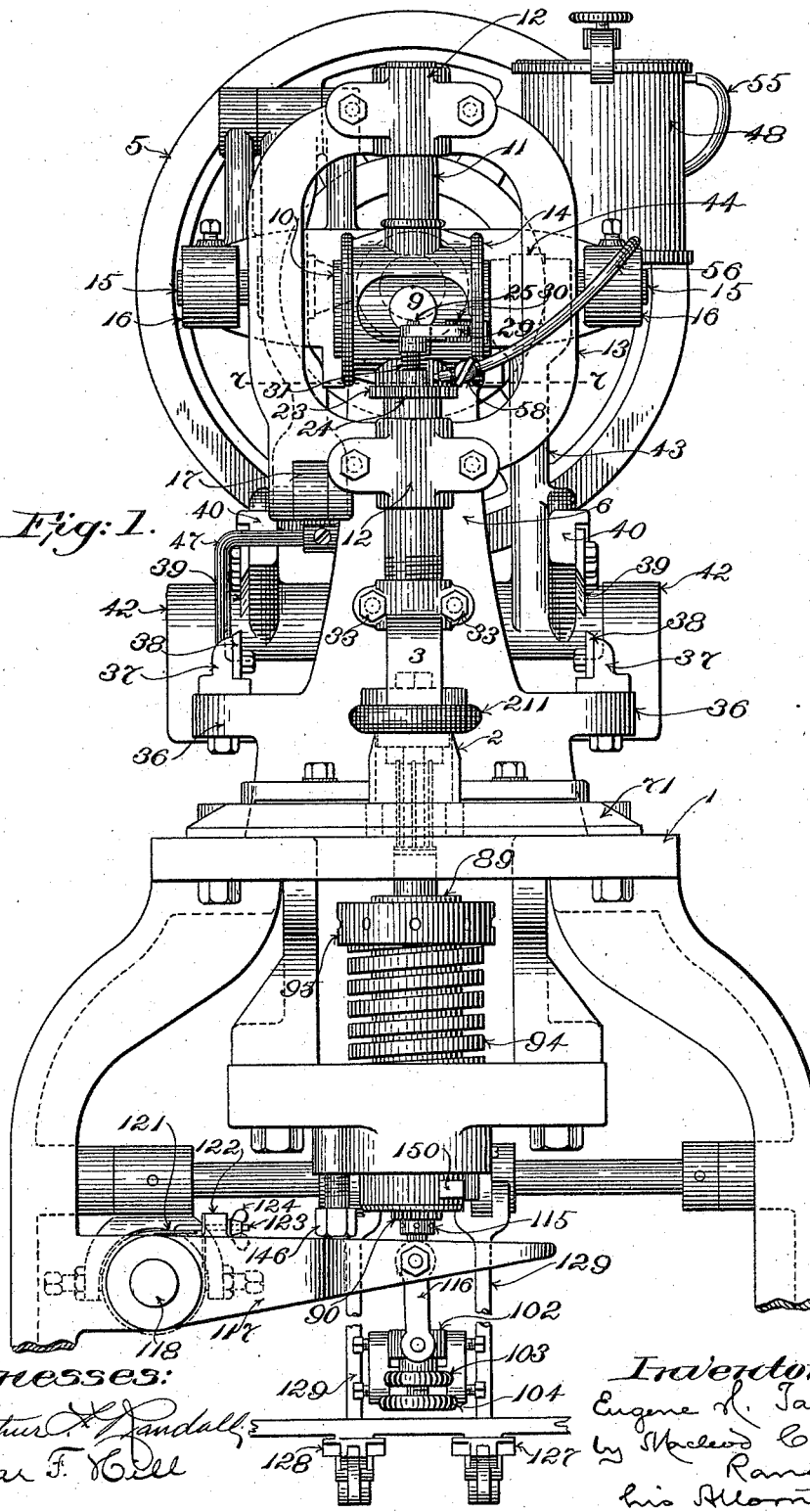

(No Model.) 5 Sheets—Sheet 1.

E. H. TAYLOR.
HEEL MAKING MACHINE.

No. 575,440. Patented Jan. 19, 1897.

Witnesses:
Arthur L. Randall
Oscar F. Hill

Inventor:
Eugene H. Taylor
by Macleod Calver &
Randall
his Attorneys

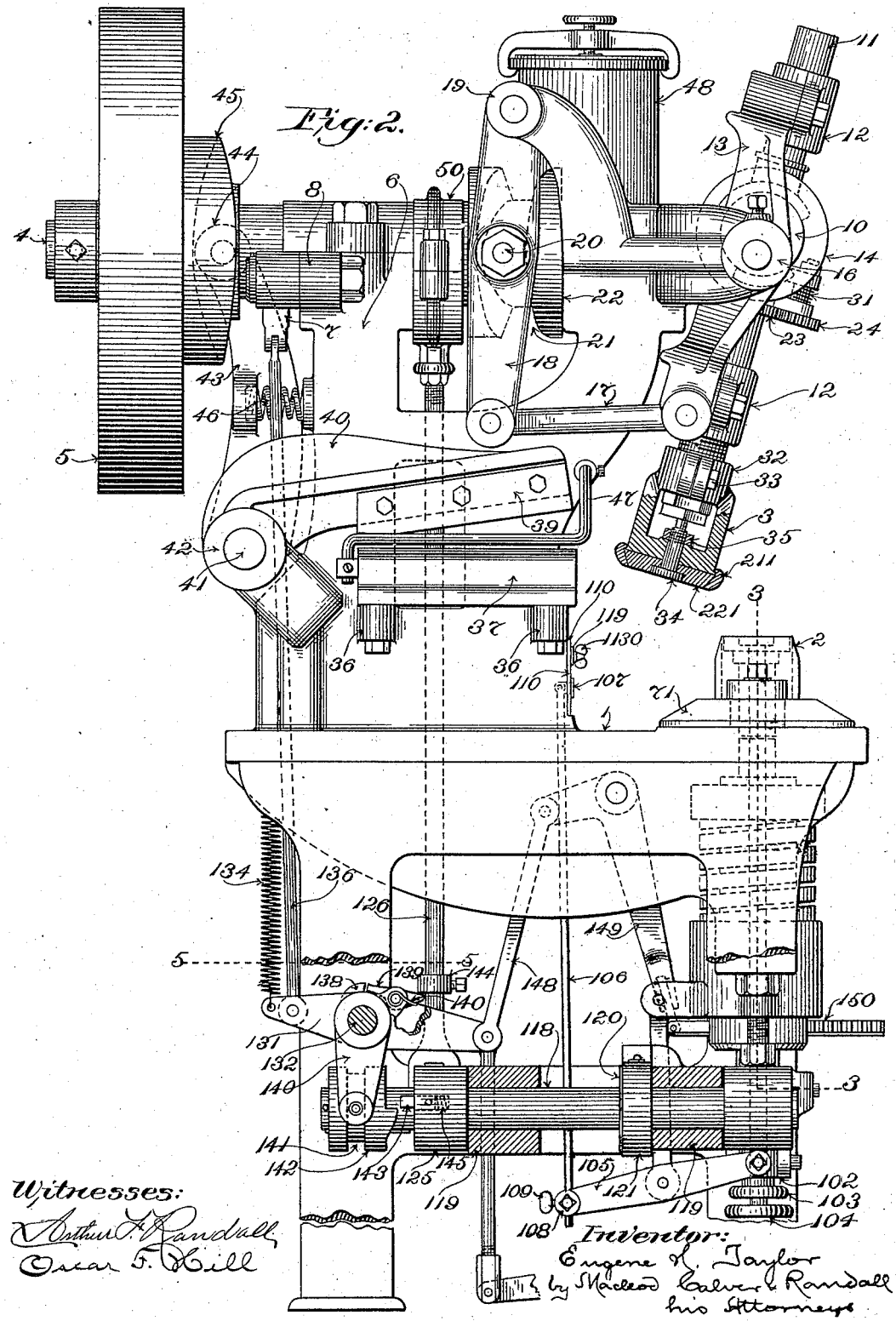

(No Model.) 5 Sheets—Sheet 3.
E. H. TAYLOR.
HEEL MAKING MACHINE.
No. 575,440. Patented Jan. 19, 1897.
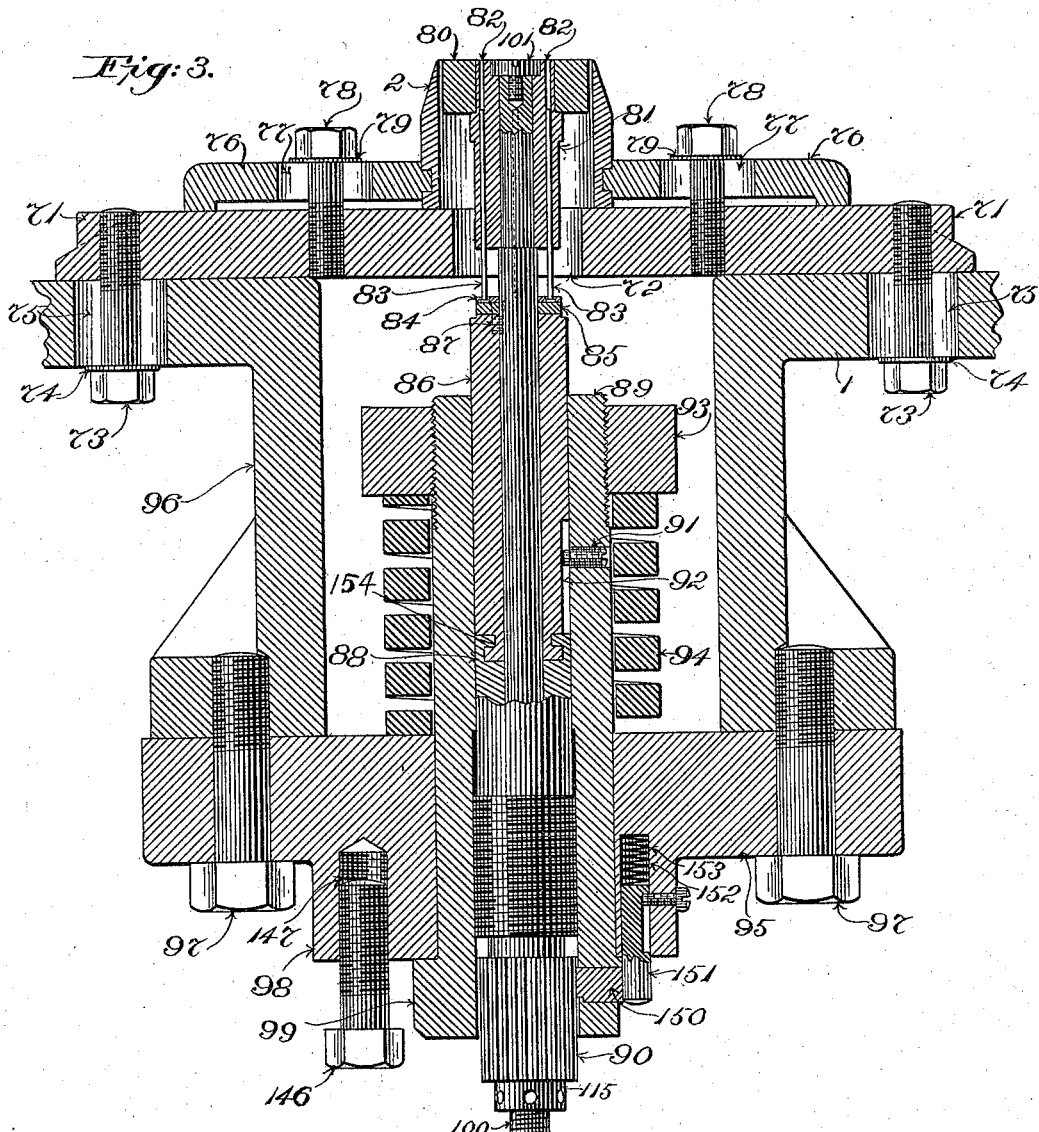
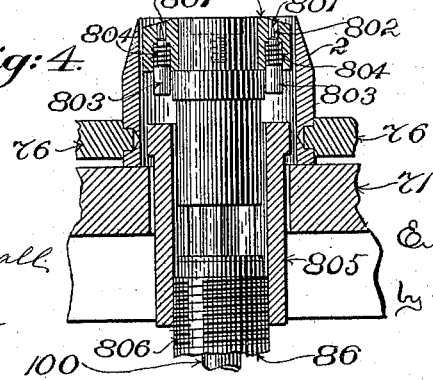

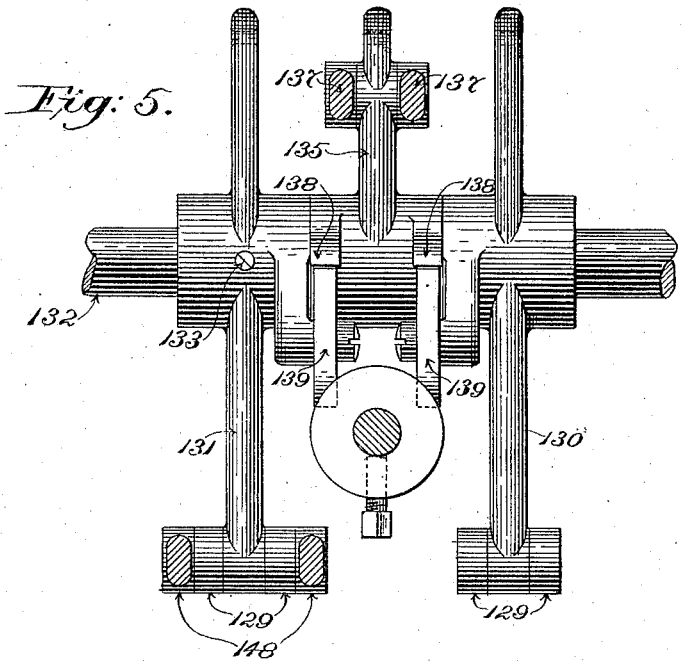
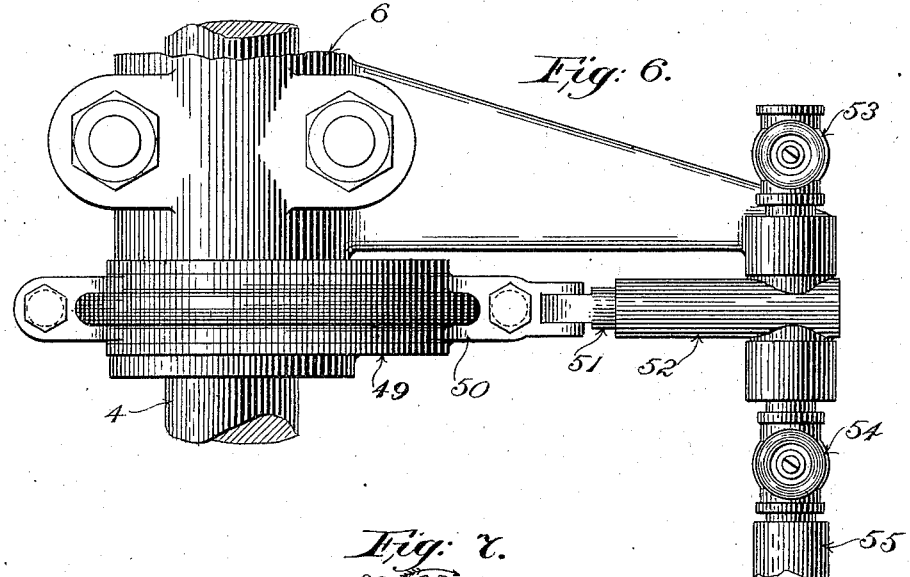

(No Model.) 5 Sheets—Sheet 5.
E. H. TAYLOR.
HEEL MAKING MACHINE.
No. 575,440. Patented Jan. 19, 1897.
Fig. 10.
Fig. 8.
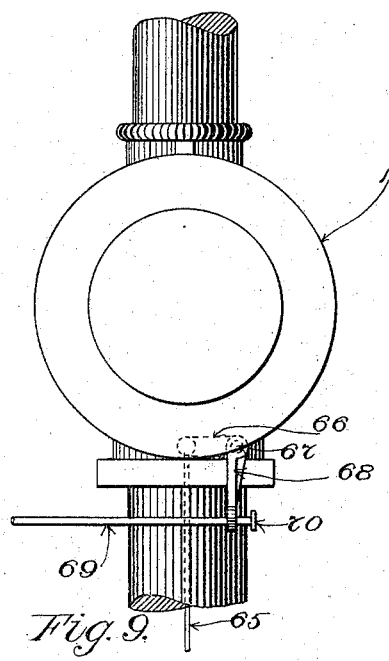
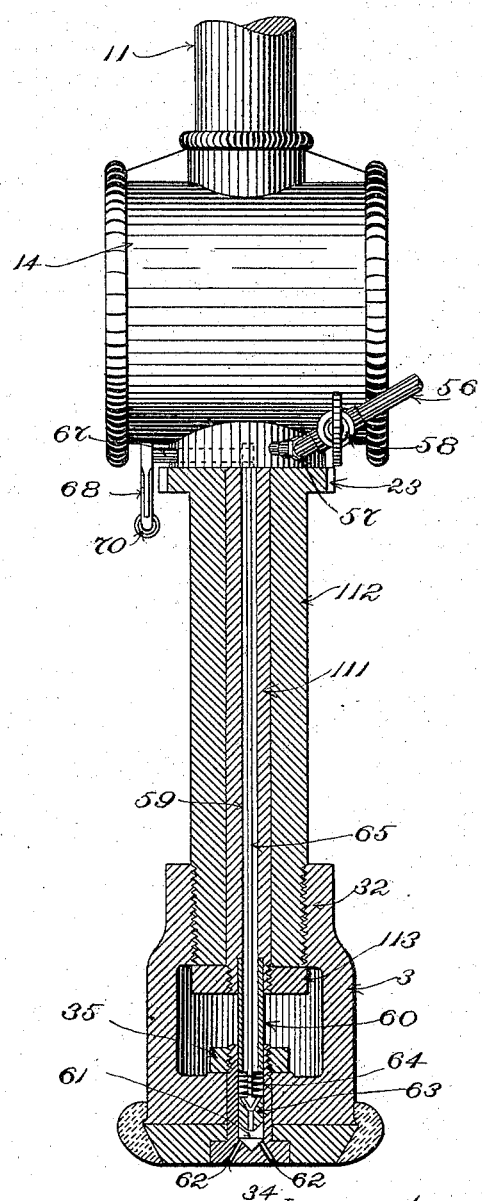
Fig. 9.
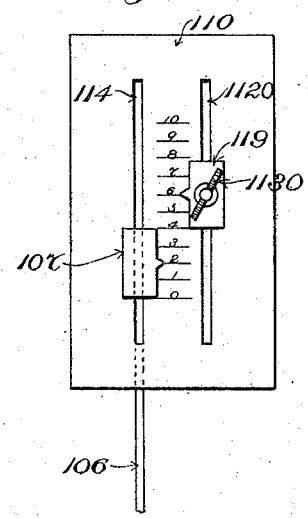
Witnesses
Oscar F. Hill
Alice H. Morrison
Inventor
Eugene H. Taylor
by Macleod Calver & Randall
Attorneys.

UNITED STATES PATENT OFFICE.

EUGENE H. TAYLOR, OF LYNN, MASSACHUSETTS.

HEEL-MAKING MACHINE.

SPECIFICATION forming part of Letters Patent No. 575,440, dated January 19, 1897.

Application filed March 23, 1896. Serial No. 584,394. (No model.)

*To all whom it may concern:*

Be it known that I, EUGENE H. TAYLOR, a citizen of the United States, residing at Lynn, in the county of Essex and State of Massachusetts, have invented certain new and useful Improvements in Heel-Making Machines, of which the following is a specification, reference being had therein to the accompanying drawings.

The invention will be described first with reference to the accompanying drawings, in which is represented the best embodiment thereof which has been produced, after which the characteristic features thereof will be particularly pointed out and distinctly defined in the claims at the close of this specification.

Figure 1, Sheet 1, of the drawings shows in front elevation a machine embodying my invention, the lower parts of the stand being broken away. Fig. 2, Sheet 2, shows the said machine in elevation, viewed from the left-hand side in Fig. 1, certain parts being represented in vertical section in order to disclose more clearly certain features of construction. Fig. 3, Sheet 3, represents in vertical section, on line 3 3 of Fig. 2, the die, its supports, and certain adjacent parts. Fig. 4, Sheet 3, is a similar view representing the provisions that are made to enable a rand to be attached to a heel by the action of the machine. Fig. 5, Sheet 4, is a detail view, partly in horizontal section on line 5 5, Fig. 2, but chiefly in plan. Fig. 6, Sheet 4, is a detail view illustrating the pumping devices by means of which to force cement or paste to the point at which the same is applied to the lifts of the heel. Fig. 7, Sheet 4, is a view in horizontal section on the line 7 7 of Fig. 1. Fig. 8, Sheet 5, is a view showing, detached, the plunger and anvil and certain associated parts, the lower portion of the view being in vertical section in order to illustrate the internal construction more clearly. Fig. 9, Sheet 5, is a view showing indicator devices which are described hereinafter. Fig. 10, Sheet 5, is a view showing certain of the devices of Fig. 8, looking at them from the left-hand side in Fig. 8.

1 is a horizontal portion or table forming part of the supporting-framework of the machine. 2 is the die, which is mounted upon the said horizontal portion or table in a manner which is explained hereinafter.

3 is a block or anvil by means of which pieces of leather that are laid or held over the edge of the die are driven down upon the same, and thereby are cut, the said block or anvil being actuated by means presently to be described herein.

4 is a shaft having the heavy band-pulley 5 mounted loosely upon the rear end thereof, and supported to rotate in bearings in the upper portion 6 of the framework. A clutching arrangement of usual and well-known character is employed in connection with the said shaft 4 and loose band-pulley 5, whereby to enable the two to be coupled together whenever it is desired to effect the rotation of the said shaft in unison with the continuously-rotating band-pulley. The clutching devices are of so familiar a character that it is unnecessary to present them in detail.

7 is the clutch-lever, it being pivoted to an ear or bracket 8 on the framework and being operated by means which is described hereinafter. When this lever is operated by the attendant upon the machine, the shaft 4 is caused to make one revolution with the band-pulley, and it then comes to rest.

9 is a crank-pin at the front end of the shaft 4, it fitting within a cylindrical hole that is formed diametrically through a cylindrical block 10. The longitudinal axis of block 10 is at right angles to that of the shaft 4, and the said block is capable of sliding upon the crank-pin 9 in the direction of the length of the latter.

11 is a plunger having the block or anvil 3 affixed to the lower end thereof. The upper and lower portions of the said plunger are steadied by means of guides 12 12, which are provided on a yoke 13. The said plunger has an intermediate portion 14, which has a cylindrical opening extending transversely through the same, and to which opening the cylindrical block 10 is fitted, with capacity to slide endwise therein. This capacity enables the said block to follow the crank-pin 9 in the rotary movement of the latter. The yoke 13 is mounted pivotally upon center-pins 15 15, which latter engage with the opposite sides of the yoke and are fixed in projecting portions 16 16 on the upper portion 6 of the framework. The pivotal axis of the yoke intersects the axis (prolonged) of shaft 4. A rod 17 connects the yoke 13 to a lever 18, the latter being pivoted to a projection 19 on the portion 6 of the framework, and being provided with a pin or roller at 20, which latter works in the groove 21 of a cam 22, that is fast on the shaft 4.

The result of the construction and connections which have been described is that while the plunger 11 is moving lengthwise in response to the action of the crank the yoke is swung or vibrated backwardly and forwardly. The cam-groove 21 is so formed and its timing is such that in the elevated position of the block 3 the latter is carried to the rear of the die, completely uncovering the latter, as shown in Fig. 2, and in the descent of the block it has little or no forward movement at first, being then brought forward in a curved or inclined sweep until completely over the die, when it descends vertically. Fig. 1 shows the anvil or block resting upon the die. The object of permitting the block or anvil to complete a considerable portion of its descent before it is carried forward over the die is to enable it to act in its forward movement to brush off the attendant's hand or fingers should any part thereof be permitted to remain over the die.

211 is a ring of soft or yielding material, such as rubber, which may be applied to the lower edge of the anvil or block 3 to lessen the chance of injury to the attendant through the contact of the said edge with his hand or fingers.

221 is a disk of Babbitt metal or other suitable material which is applied to the under surface of the anvil or block 3 to receive the cutting edge of die 2. For the purpose of distributing the wear due to the action of the said cutting edge upon the said disk 221 I cause the block or anvil to be intermittingly rotated. To this end the lower portion 111 of the plunger is reduced in diameter and made cylindrical (see Fig. 8, Sheet 5) to receive thereon the sleeve 112, to the lower end whereof the anvil or block 3 is attached. The said sleeve is free to rotate within the lower one of the guides 12, and is held in place on the portion 111 by a nut 113 applied to the free end of such portion. On the upper end of sleeve 112 is formed or secured the spur-gear 23, Figs. 1, 2, 7, and 8, with which meshes the smaller spur-gear 24. The last is mounted loosely upon the lower portion of a small spindle 25, the said portion having therein recesses 26 26, Fig. 7, with inclined bottoms, within which are placed small rollers or balls 27 27, the latter having applied in connection therewith springs 28 28, which act with a tendency to force them into the shallower portions of the recesses 26 26.

What I have described constitutes a well-known form of intermittent grip-clutch, by means of which as the spindle 25 is rocked the spur-gear 24 will be rotated intermittingly in the direction of the arrow in Fig. 7. Through the intermeshing of the two spur-gears 24 and 23 the sleeve 111 and its anvil or block are rotated intermittingly also.

A convenient means of rocking the spindle 25 consists of an arm 29, which is made fast upon the said spindle 25, a recess 30, which is formed in the forward side of the cylindrical block 10, and a spring 31, which is applied to the spindle 25 and acts to hold the arm 29 pressed against the face of block 10. The endwise movement which is given by crank-pin 9 to the said block carries the said recess laterally into and out of position to be entered by the arm 29. In effect the forward face of block 10 is formed with a cam at 30 to act on arm 29 and operates in conjunction with spring 31 to produce the rocking movement of spindle 25. The lower end of sleeve 112 is screw-threaded exteriorly to fit within the correspondingly-threaded nut or socket 32, that is provided on the anvil or block 3. The said anvil or block is turned on the sleeve 111 until it has been given the desired height thereon. To provide against accidental shift of the anvil or block, the said nut or socket 32 is split, and it is provided with bolts 33 33, by means of which the portions of the same may be clamped tightly upon the threaded portion of the sleeve.

At 34 is a clenching-block, it being located centrally of the block or anvil 3, and the lower end thereof being exposed at the center of the disk 221 of Babbitt metal. The stem of this clenching-block passes through the lower part of the block or anvil 3 and is threaded to receive thereon the nut 35 by means of which it is secured in place. The enlarged lower end of the clenching-block overlies portions of the disk 221, and thereby the latter is secured to the lower end of the anvil or block 3. (See particularly Figs. 2 and 8.)

To provide for trimming off the pieces of leather which are used in the manufacture of heels, prior to placing such pieces upon the die, I apply cutting or shearing devices as follows: 36 36 are horizontal projections at opposite sides of the upper portion 6 of the framework, to which projections are bolted blocks 37 37. To the said blocks 37 37 in turn are bolted shear-blades 38 38. Other shear-blades 39 39 are bolted to the forwardly-extending arms 40 40 of a transverse rock-shaft 41, the latter being supported in bearings in projections 42 42 of the framework and being provided with an arm 43, carrying a roller 44, which is pressed by a spring 46 into contact with the surface of a cam 44 on the band-pulley 5. By the said cam and spring the blades 39 39 are kept in motion. By placing cutting devices on both sides of the machine the attendant is enabled to use either hand in trimming off the pieces of material which are to be used in the production of heels.

47 47 are guards which are located outside of each stationary blade 38. These guards extend horizontally above the blocks 37 37, leaving just sufficient room for the introduction of a piece of leather through the slot between a guard and the adjacent block 37, so as to prevent the attendant's fingers from being thrust into the path of a moving cutting-blade.

Sometimes it is desired to apply paste, cement, or other adhesive to the surface of the different layers or lifts of which a heel is composed. To provide for making this application, I equip the machine with a closed reservoir 48, Figs. 1 and 2. Into this reservoir the paste or cement is poured, and it is forced therefrom by air-pressure produced in the reservoir by means of an air-pump. (Shown in Fig. 6, Sheet 3.) Referring to said Fig. 6, 49 is an eccentric on shaft 4, and 50 is the strap surrounding the said eccentric. To one side of the said strap 50 is jointed the plunger or piston 51, working in a cylinder 52.

53 is a check-valve on the inlet side of the cylinder 52. 54 is a check-valve on the outlet side of the cylinder 52, and 55 is a tube leading to the upper portion of the closed reservoir 48. From the lower portion of the said reservoir 48 leads a tube 56, which is connected with the lower portion of plunger 11, at a point above the upper end of sleeve 112, by means of a coupling 57, which is equipped with a hand-operated valve 58, by means of which to vary or shut off the flow, as desired. A passageway 59 leads downward through the lower portion of the plunger, a tube 60 being inserted into the enlarged lower end of such passage-way. This tube 60 projects into the central chamber 61, which is formed in the upper cylindrical portion of the clenching-block 34. From chamber 61 a number of inclined passages 62 62 extend to the lower surface of the clenching-block, as shown in Fig. 8.

63 is a valve which is located in the chamber 61, it being provided to control the flow of the paste or cement through the passages 62 62.

64 is a spring which is compressed between the lower end of tube 60 and the valve 63 and tends to press the valve to its seat, so as to close the passages 62 62.

The valve is perforated centrally, as shown in Fig. 8, to permit of the flow of the paste or cement through the same when it is raised from its seat, but when it is depressed onto its seat the unperforated portion thereof covers the inner ends of the passages 62 62. The valve is attached to the lower end of a rod 65, which is contained in the passage-way 59. At its upper end the said rod is connected with the horizontal arm 66 of a rock-shaft 67, mounted in the plunger 11, the said rock-shaft having a depending arm 68, which is perforated for the passage therethrough of a rod 69. The outer end of this rod has a nut or enlargement 70 thereon, and the inner end thereof is connected pivotally with the framework. Thereby, as the lower end of the plunger swings outwardly over the die from the position which is represented in Fig. 2, the valve is raised to permit a discharge of paste or cement, and the pressure of the anvil or block 3 upon the exposed surface of the material in the die 2 applies the paste or cement thereto.

The die 2 rests upon a base-plate 71, the latter in turn resting upon the horizontal portion or table 1, and being secured to the same by bolts 73 73, passing through transverse slots 75 75 in said horizontal portion or table and into the said base-plate, washers 74 74 being placed between the bolt-heads and the under side of the part 1. The base-plate 71 has a hole 72 therethrough, around the upper end of which the die is placed, and through which pass the nail-holder and certain connected parts. The slots 75 75 enable the base-plate to be adjusted laterally in order to bring the hole 72 in proper position relatively to the said nail-holder, &c. The die is secured in place on the base-plate 71 by securing-plates 76 76, as usual, the latter resting on said base-plate and having projections which enter holes or recesses in the body of the die, as shown in Fig. 3, the said plates 76 76 having slots 77 77, through which pass bolts 78 78. The threaded ends of the said bolts enter the base-plate 71, and 79 79 are washers between the bolt-heads and the upper surfaces of the plates 76 76. Slots 77 77 permit adjustment of the die laterally upon the surface of the base-plate, as may be required in order to locate the hole through such die properly with reference to the hole 72 in the base-plate and to the parts which pass through the said hole 72.

80 is a follower or die-filler which is placed within the die and surrounds the upper end of the nail-holder 81, the said follower or die-filler resting on a shoulder on said nail-holder and being supported thereby. Vertically through the nail-holder 81 extend holes 82 82 for the reception of nails and of the nail-drivers 83 83. The lower ends of the drivers 83 83 pass through holes in a disk 84, constituting a driver-holder, the said drivers having heads or flanges thereon beneath the said disk 84, which enables the disk to hold them in place on the upper side of a driver-block 85. The disk and driver-block are secured in place on the upper end of a sleeve 86 by means of a screw or screws 87. The lower end of the sleeve 86 rests on the upper end of a second sleeve 88, the latter having an exteriorly-threaded portion, which engages with the internal thread of a tubular post 89. The sleeves 86 and 88 are both placed within the posts 89, the upper end of sleeve 86 projecting at the top of said post. The lower end of sleeve 88 is toothed to constitute a gear 90 of considerable length and projects below the bottom end of post 89. By rotating the sleeve 88 by means of power applied to the said gear 90 the position of the two sleeves 88 and 86 may be varied vertically. By this means the height of the upper ends of the drivers may be adjusted to suit the thickness of the heel which it is desired to make. A screw 91 projects through the side of the post 89 into a longitudinal groove 92 in the sleeve 86 to prevent the latter from turning. The upper end of post 89 is screw-threaded exteriorly and to the same is fitted the nut or collar 93. A spiral spring 94 surrounds the post below this nut or collar and is compressed between the latter and the plate 95. The said plate 95 is secured by bolts 97 97 to the lower end of the hollow boss 96, depending from the horizontal portion or table 1 of the framework, and it in turn is furnished with a depending boss 98. The lower end of the post 89 has a flange 99, which engages with the lower end of boss 98 to arrest the rise of the post under the action of the spring 94. The spring 94 is of sufficient strength to constitute a yielding support or cushion by means of which the post 89, the sleeves 88 and 86, and the driver-block and drivers are upheld and maintained in proper working position while the successive layers of material are being struck into the die by the action of the anvil or block 3 and forced downwardly within the said die onto the nails that are contained in the holes 82 82, the said nails being upheld by the nail-drivers 83. When, however, the die 2 becomes filled to such an extent that the lower end of nail-holder 81 is carried down into contact with the disk 84, should another layer of material inadvertently be applied at the top of the die and the block or anvil 3 be caused to strike down upon such layer the spring 94 will yield, and by compressing will permit of the depression of the post 89 and the parts which are supported thereby, so as to obviate breakage or injury. On the following rise of the block or anvil the spring 94 will expand, raising the parts to their original position and ejecting the surplus layer from the die 2.

Through the sleeves 86 and 88 passes a rod 100, (see Fig. 3,) on the upper end of which the nail-holder 81 is mounted, the said upper end being reduced slightly in diameter to form a shoulder on which the lower end of the nail-holder rests. The nail-holder is held from rising off the said reduced end of the rod 100 by means of the screw 101. The friction between the exterior of the rod 100 and the interiors of the sleeves 86 and 88 tends to hold said rod in its position. An adjustable collar 115, Figs. 1 and 3, is mounted upon the lower end of the said rod and by contact with the lower end of the sleeve 88 or the gear 90 thereon arrests the upward movement of the said rod and thereby prevents the nail-holder and follower 80 from being raised too far within the die 2. By means of adjustable collar 115 the rise of the follower 80, &c., is limited according to the height of the dies. The lower end of this rod has mounted thereon the nut 102, below which on the rod are applied the lock-nuts 103 104.

To the nut 102 is pivotally connected the forward end of a lever 105, the rear end of which has connected therewith a rod 106. To the upper end of the said rod 106 is connected the movable index or indicator 107, Figs. 1 and 9. Connection between the lever 105 and the rod 106 is made by means of a block 108, swiveled upon the said lever, and through a hole in which the rod 108 passes, the clamping-screw 109 serving to bind the rod in the said hole. The scale in connection with which the index or indicator 107 operates is marked 110, and is shown most clearly in Fig. 9. It has a vertically-arranged series of graduations, which are numbered from "0" upward in an ascending order, as indicated in Fig. 9, to correspond with the thicknesses of heels that it is desired to produce. The indicator or index 119 is intended to be fixed upon the scale 110 at the desired point to indicate the completion of a heel of the desired thickness. It is adjustable along a slot 1120, and is secured at the desired point in the length of the said slot by means of a clamping-screw 1130. The slot along which the moving indicator 107 slides is indicated at 114 in Fig. 9.

The scale 110 is located on the front face of the upright portion 6 of the framing immediately to the rear of the die 2 and is visible over the top and past the sides of the said die, being plainly within the range of view of the attendant upon the machine, and serves clearly to indicate to the attendant the amount of material which has been up to a given moment inserted into the die, and also how close to completion is the heel which is being made. As a means of holding the rod 100 and nail-holder and the die-filler from descending, except as they are forced downward by the action of the anvil or block 3 in driving new layers of material into the die, the nut 102 has pivotally connected therewith one end of a link 116, the other end of which is pivotally joined to the horizontally-extending arm 117, which is fast on a forward end of a shaft 118, mounted in bearings 119 119 in the lower part of the framing. The said shaft has fast thereon a collar 120, around which passes a friction band or strap 121, one end of which is made fast to a projection 122, while to the other end thereof is applied a screw-threaded hook 123, which passes through the said projection 122 and has placed thereon the adjusting-nut 124, as shown clearly in Fig. 1. The brake-band 121 provides against accidental movement of the shaft and arm and also against overrunning thereof and operates to retain the shaft, the arm, and the parts which are connected with the said arm in any given position in which they are placed.

For the purpose of ejecting from the die 2 a heel which has reached the desired thickness I combine with the shaft 118 an arm 125, which is swiveled loosely on the said shaft, the said arm having connected thereto one end of a rod 126, the upper end whereof is joined to the strap 50 surrounding the eccentric 49. By means of said rod and strap a vibratory motion is transmitted from the eccentric 49 to the arm 125. I provide, as presently will be explained, clutches which are under the control of the operator, and thereby when he observes that the sliding indicator or index 107 has reached a position opposite the fixed indicator or index 111 he may clutch the said arm 125 temporarily to the shaft 118. The following upward movement of the arm 125 occasions thereupon an upward movement of the arm 117 and parts connected therewith, thus raising the nail-holder and die-filler to the top of the die and thereby discharging the finished heel from the die $A^6$.

The extent of the movement of the arm 117 on the shaft 118 is fixed and determined by means of a set-screw 146, the stem of which is received in a threaded socket 147 in the boss 98 of the plate 95.

As will be understood from the description which already has been given herein relating to the block or anvil 3 and its actuating devices, the said block or anvil remains normally at rest in the elevated and rearward position which is represented in Fig. 2, and in order to occasion a blow of the said anvil or block upon a piece of material which has been laid upon the die 2 it is necessary to operate the clutch-controlling lever 7, so as to permit the loose continuously-driven band-pulley 5 to be connected for a period with the shaft 4. The band-pulley and shaft having been thus connected, the shaft 4 will make one revolution and then come to rest again, during which revolution the block or anvil will be caused to descend against the die and then return to its normal position. (Shown in Fig. 2.)

In order to provide conveniently for the actuation of the clutch-controlling lever 7 and also for clutching the arm 125 to the shaft 118, I provide treadles 127 and 128. (See more particularly Fig. 1.) The rear ends of these treadles are connected by rods 129 with the forward arms of levers 130 131, which are mounted upon a shaft 132, extending transversely of the machine in bearings which are provided on the framework 1. The lever 130 is loose upon the shaft 132, while the lever 131 is made fast to the said shaft by means of a clamping-screw 133 or in other convenient manner. To the rearwardly-extending arm of each of the said levers 130 and 131 is connected a spiral spring 134, (see Fig. 2,) by means of which the said rearwardly-extending arm normally is held raised. Upon the said shaft 132, between the hubs of the two levers 130 and 131, is secured loosely an arm 135. This arm also has a spring 134 connected therewith by means of which to hold it in an elevated position. The said arm 135 is joined by a rod 136 with the clutch-controlling lever 7, as shown most clearly in Fig. 2. Upon the hub of the arm 135 are upwardly-extending projections or teeth 138 138, and pivotally mounted upon each of the levers 130 and 131 is a pawl 139, as shown clearly in Figs. 2 and 5. The said pawls 139 139 are acted upon by springs 140, (shown in Fig. 2,) which tend to throw the operative ends of the said pawls down into position for engagement with the teeth or projections 138 138 upon the hub of the arm 135. In the normal position of the parts the operative ends of the pawls 139 139 lie in front of the said teeth or projections 139 139, as indicated in Figs. 2 and 5, in readiness to act again when the levers 130 and 131 are moved through the medium of their connected treadles 127 and 128.

The treadle 127 is intended to be moved by the foot of the operator in order to occasion each blow of the anvil or block 3, and the result of the movement of the said treadle is to turn the loose lever 130 upon the shaft 132 and by means of the pawl 139, which is applied to the said lever and which engages with a tooth or projection 138 on the hub of the arm, to depress the said arm and by means of the rod 136 operate the clutch-controlling lever 7, so as to occasion the temporary clutching of the band-pulley 5 on the shaft 4, and thereby produce a movement of rotation of the said shaft 4.

The treadle 128 is intended to be operated by the attendant for the purpose of causing the discharge of a completed heel from the die 2. When the said treadle is moved, it actuates the lever 131 and through the pawl 139, connected with the said lever and engaging with a tooth of the projection 138 on the arm 135, operates the clutch-controlling lever 7 in the manner which has just been described in connection with the treadle 127. Thereby the final layer of material is driven into the die. The said movement of the lever 131 causes the shaft 132 to be rocked. On the outer end of the said shaft 132 is a depending arm 140, carrying a pin which enters the groove 141 of a clutch-hub 142, that is splined to the shaft 118. The movement of the shaft 132 aforesaid causes this clutch-hub 142 to be slid lengthwise of the shaft 118 and carries a projecting tooth on the said clutch-hub into position to engage with a pin 143, projecting from one side of the hub of the arm 125. In the next rise of the arm 125 the pin 143 strikes against the square side of the tooth aforesaid on the clutch 142, and thereby occasions a rocking movement of the shaft 118, which moves the arm 117 and connected parts upwardly, this upward movement causing the completed heel to be pushed up out of the die 2 in a manner which will be understood.

In order to provide against the clutch-controlling lever 7 being left in position for action during more than one revolution of the shaft 4, a collar 144 is made fast upon the connecting-rod 126, and at each descent of the said connecting-rod 126 the said collar 144 strikes against the tail of that one of the pawls 139 139 which is in operative position, thereby lifting the operative end of said pawl out of engagement with the tooth or corresponding projection 138 on the hub of the arm 135 with which said pawl is in engagement, thereby freeing the arm 135 and allowing it to be returned to the normal inoperative position by means of the spring 134. The machine is thereby rendered incapable of producing two or more strokes of the block or anvil 3 in succession. The pin 143 is made yielding, being backed by a spiral spring 145, which holds it normally in the projected position in which it is represented in Fig. 2, in readiness to engage with the tooth on the side of the clutch-hub 142 as the arm 125 swings upward. In the opposite movement of the arm, should the end of the pin bear against the inclined side of the tooth, it will simply move endwise into the hole in which it is placed in the hub of arm 125. Thereby the arm 125 and its pin 143 are rendered incapable of engaging with the clutch-hub 142 to actuate the shaft 118 and connected parts except in the upward movement of the arm 125.

With the object in view of providing for the clenching of the nails by which the layers of material are held together to form the heel I connect the forward arm of the lever 131, by means of a rod 148, with the short arm of the bell-crank 149, the long arm of which is connected to a rack 150, (see Figs. 1, 2, and 3,) that engages with the gear 90 on the lower end of the sleeve 88. The rack 150 moves in a guide-passage that is formed therefor through the lower end of the post 89, and it is held in engagement with the said gear 90 by means of a pin 151. The said pin is fitted to a recess 152 in the boss 98 of the plate 95, and it is projected into position to engage with the rear side of the said rack by means of a spiral spring 153, that is contained in the said recess. The movement of the lever 131 that is occasioned through the actuation of the treadle 128 causes the rack 150 to be moved endwise, thereby turning the sleeve 88, and through the engagement of the screw-thread on the exterior of the said sleeve with the corresponding screw-thread on the interior of the guide-post causing the said sleeve 88 to rise within the post 89, the sleeve 88 carrying up with it the sleeve 86. This raises the driver-block or anvil and drivers to a slightly-higher elevation, and also forces upwardly the nails which are located in the holes 82 82 on the nail-holder 81. When now the anvil or block 3 descends to drive the final layer of material into the die 2, the clencher 34, which is carried by the said anvil or block, strikes against the projecting upper ends of the said nails and clenches them in the upper layer of material. When the spring 134 is permitted to return the lever 131 to its normal position, the rack 150 also is moved to its former position, thereby causing the sleeves 88 and 86, together with the driver-block 85, to be drawn down to their usual height.

Fig. 3 shows the preferred means of connecting the sleeves 86 and 88 together so as to cause them to descend in unison. In said Fig. 3 one of the said sleeves is provided with a circular projection 154 at the end thereof, the said projection being formed with a flange of slightly-increased diameter, while the other of said sleeves is formed with a corresponding recess, which is undercut to receive the said flange. The entrance to this recess is through an opening extending to the periphery of the sleeve in which it is formed, the sleeves being united by a transverse movement prior to the rod 100 being passed through the same.

When a rand is to be secured to the heel in the process of making the latter, I bevel off the top of the die-filler 80, as indicated in Fig. 4, and I form in the said die-filler pockets 801 for the reception of tacks 802, by means of which the rand is to be secured in place to the surface of the layer of material in contact with which it rests. The die-filler is provided, in addition, with a series of tack-drivers 803 803, movable vertically in the sockets therein, as indicated in Fig. 4, and held normally in a depressed position by means of the springs 804 804. 805 is a sleeve which is fastened to the upper end of the sleeve 86, the latter being screw-threaded exteriorly at 806 to permit the said sleeve 805 to be screwed onto the same. In the descent of the die-filler and connected parts the lower ends of the tack-drivers 803 are caused to come in contact with the said sleeve 805, and being thereby arrested in their descent the tacks are caused to pass through the rand and into the next layer of material, as will be understood.

By disposing the nails properly the rand may be applied and secured in place of the first lift, in which case no separate or independent tacks for the rand would be required.

I claim as my invention—

1. The combination with the die, of the block or anvil, the plunger carrying the said block or anvil, a frame in which the plunger has longitudinal movement, means to reciprocate longitudinally the plunger in the said frame, and means connected with the said frame to impart a lateral movement thereto at each action of the plunger and thereby place the block or anvil in a retracted position to uncover the die each time it is elevated and also cause it to have a forward sweep in each downward movement thereof, substantially as described.

2. The combination with the die, of the block or anvil, the plunger carrying the said block or anvil, a frame in which the plunger has longitudinal movement, an operating-shaft, a crank thereon having operative connection with the said plunger whereby to reciprocate the latter, a cam on the said shaft, and operative connections between the said shaft and the said frame whereby to move the said frame laterally, substantially as described.

3. The combination with the block or anvil, and the plunger carrying the said block or anvil, of the cylindrical block fitted to slide lengthwise and also to turn in the said plunger, an operating-shaft having a crank-pin passing through the said block, a frame in which the plunger is mounted to move longitudinally, and means to impart a lateral movement to the said frame, substantially as described.

4. The combination with a block or anvil, and the plunger carrying the said block or anvil, of the cylindrical block fitted to slide lengthwise and also to turn in the said plunger, an operating-shaft having a crank-pin passing through the said block, a frame in which the plunger is mounted to move longitudinally, a cam on the said shaft, and operative connections between the said cam and the said frame whereby to impart a lateral movement thereto, substantially as described.

5. The combination with the die, and the block or anvil, of actuating means for the latter having provisions whereby the elevated block or anvil is given a retracted position and in its descent moves with substantially a horizontal sweep forward to a position over the die, whereby to brush off any object overlying the latter, substantially as described.

6. The combination with the die, the nailing devices, and the block or anvil, of the plunger carrying the said block or anvil, means to reciprocate said plunger, and means to communicate a lateral movement to said plunger whereby the elevated block or anvil is given a retracted position and in its descent moves with a substantially horizontal sweep forward to a position over the die, whereby to brush off any object overlying the latter, substantially as described.

7. The combination with the block or anvil, and the plunger carrying the same, of the block 10 free to move transversely of the said plunger, the actuating-shaft, its crank-pin engaging said block, and means operated from the said transversely-movable block 10 to intermittingly rotate the said block or anvil, substantially as described.

8. The combination with the block or anvil, the plunger carrying the same, the block 10 free to move transversely of the said plunger and provided with a cam, the actuating-shaft, and its crank-pin engaging said block, of the shaft 25, its arm actuated by the cam on the block 10, and an intermittent clutch device to transmit movement from shaft 25 to the block or anvil, substantially as described.

9. The combination with the anvil or block, and the disk 221 applied thereto, of the clenching-block having a stem passed through the said disk and the anvil or block and securing the disk to the latter, and securing means applied to the inner end of the said stem, substantially as described.

10. The combination with the nail-drivers, the sleeve 86 having the nail-drivers at one end thereof, the sleeve 88 at the other end of said sleeve 86, and the hollow post containing said sleeves and in screw-threaded engagement with the sleeve 88, whereby the position of sleeve 86 and the nail-drivers may be adjusted, substantially as described.

11. The combination with the die, the nail-holder, the rod 100 supporting the nail-holder, and the nail-drivers, of the sleeves 86 and 88 through which said rod passes, the sleeve 86 having the nail-drivers applied at the upper end thereof, and a support surrounding said sleeves and having the sleeve 88 in screw-threaded engagement therewith, whereby the position of the sleeves and nail-drivers may be adjusted, substantially as described.

12. The combination with the block or anvil, and the die, of a spring-supported stop which determines the amount of material to be received and retained within the die and reacts to eject the surplus material, substantially as described.

13. The combination with the block or anvil, the die, and a follower movable within the die as the material is received in the latter, of the spring-supported stop 86, which determines the amount of material to be retained within the die and ejects surplus material, and also yields to prevent breakage, substantially as described.

14. The combination with the die, the nail-holder, the rod 100 supporting the nail-holder, and the nail-drivers, of the sleeve 86 through which the rod 100 passes, a support for said sleeve, and a spring to sustain said support, substantially as described.

15. The combination with the die, the nail-holder, the rod 100 supporting the nail-holder, and the nail-drivers, of the sleeves 86 and 88 through which the said rod passes, the said sleeve 88 having an external screw-thread, the hollow post 89 having an internal screw-thread, and an elastic support for post 89, substantially as described.

16. The combination with the nail-drivers, the sleeve 86 having the nail-drivers at one end thereof, the sleeve 88 at the other end of said sleeve 86 and having a screw-threaded exterior, and a hollow post containing said sleeves and having an internal screw-thread to engage with that of the sleeve 88 of devices in operative connection with said sleeve 88 whereby to rotate the same to adjust the parts into position for clenching, substantially as described.

17. The combination with the nail-drivers, the sleeve 86 having the nail-drivers at one end thereof, support for the said sleeve, and screw-threaded adjusting devices applied to the said support and sleeve to enable the position of the sleeve relatively to the support to be varied, said adjusting devices having a rotatable part, of devices in operative connection with the said rotatable part whereby to move the same to the position required for adjusting the nail-drivers into position to effect the clenching, substantially as described.

18. The combination with the nail-drivers, the sleeve 86 having the nail-drivers at one end thereof, the sleeve 88 at the other end thereof and the hollow post containing said sleeves and having the sleeve 88 in screw-threaded engagement therewith, of the rack in engagement with the said sleeve 88, and means to actuate the said rack to adjust the nail-drivers into position for clenching, substantially as described.

19. The combination with the block or anvil, means for actuating the same, the die, the nail-holder, the rod 100 supporting the nail-holder, and the nail-drivers, of the sleeves 86 and 88 through which the said rod passes, the said sleeve 86 having the nail-drivers applied at the upper end thereof, and a support surrounding said sleeves and having the sleeve 88 in screw-threaded engagement therewith, of means to rotate the sleeve 88 to thereby adjust the nail-drivers into the position for clenching, and means connected with the said rod 100 to actuate the same and effect the ejection of a completed heel from the die, substantially as set forth.

20. The combination with the die, and a follower within the same, of an arm operatively connected with the said follower, a shaft on which said arm is fixed, clutch devices comprising an oscillatory member normally free to move independently of the said shaft, and a member splined to the said shaft, means to actuate the said oscillating member, and means to move the said splined member into engagement with the oscillating member when it is required to eject a completed heel from within the die, substantially as described.

21. The combination with the die, and a follower therein, of an arm operatively connected with the said follower, a shaft on which said arm is mounted, and a frictional brake to resist the turning of the said shaft as the follower is depressed within the die, substantially as described.

22. The combination with the block or anvil, actuating devices therefor including a clutch and clutch-operating devices, the die, nail-driving devices, clenching devices, and ejecting devices, of two treadles, connections between the said clutch-operating devices and one of the said treadles whereby on movement being given to the latter the block or anvil is caused to act, and connections intermediate the other treadle and the said clutching devices, clenching devices, and ejecting devices, whereby on the actuation of the second treadle the block or anvil is operated to apply the last layer of material and subsequently the clenching devices and ejecting devices successively are brought into action, substantially as described.

23. The combination with the block or anvil, and actuating devices therefor, the die, the nail-holder, the nail-drivers, a backing or support for the said nail-drivers, and height-adjusting devices for said backing or support having a rotatable member, of the rack in engagement with the said rotatable member, an arm operatively connected with the said nail-holder, a rock-shaft on which said arm is fixed, a clutch member splined to the said rock-shaft, a clutch member loose on the said rock-shaft, means to oscillate said loose clutch member, a shifter for the said splined clutch member, and means to operate the said rack and shifter, whereby to raise the nail-drivers into position for clenching and raise the nail-holder to eject the completed heel, substantially as set forth.

24. The combination with the die, the block or anvil, and actuating devices for said block or anvil including a clutch, of a shaft 132, an arm 135 mounted loosely on the said shaft, the clutch-operating device 7 operatively connected with the said arm, a spring acting to move the said arm 135 in one direction, levers 130 and 131 mounted on said shaft 132, the former loose and the latter fast thereon, dogs or pawls carried by the said levers to engage with teeth or projections on the said arm 135, two treadles respectively connected with the levers 130 and 131, a shipper-arm connected with the shaft 132, a rock-shaft 118, a clutch member splined to the said rock-shaft and engaged by the said shipper-arm, a clutch member loose on the said rock-shaft, means to oscillate the said loose clutch member and to trip the said pawls or dogs at each movement of the oscillating clutch member in one direction, and ejecting devices connected with the said rock-shaft, substantially as described.

25. The combination with the die, the nail-holder, and the nail-drivers, of the die-filler 80, having pockets 801 for the reception of tacks to secure a rand in place, a series of tack-drivers 803, 803, applied to the said die-filler and movable vertically relatively thereto, and a stop or abutment with which the said tack-drivers come in contact in the descent of the die-filler, substantially as described.

26. The combination with the anvil or block having an orifice or orifices in the acting face thereof for the discharge of adhesive material, of the plunger having a passage therethrough in communication with the said discharge orifice or orifices of the block or anvil, means of supplying adhesive material to the said passage, a valve controlling the discharge of the adhesive material, valve-operating devices actuated by the transverse movement of the plunger, and means to communicate both a longitudinal and a transverse movement to the plunger, substantially as described.

27. The combination with the anvil or block having an orifice or orifices in the acting face thereof for the discharge of adhesive material, of the plunger having a passage therethrough in communication with the said discharge orifice or orifices of the block or anvil, a closed reservoir to contain the adhesive material and in communication with the said passage in the plunger, and an air-pump whereby to produce air-pressure within the reservoir, a valve controlling the discharge of the adhesive material through the said orifice or orifices, and valve-operating devices actuated by the movement of the plunger, substantially as described.

28. The combination with the block or anvil 3, the clenching-block applied thereto having a discharge orifice or orifices 62 and a central chamber 61, the plunger having a central passage communicating with the said chamber 61, means of supplying an adhesive material to the said central passage, a check-valve in the said chamber 61, a rod or stem connected with the said check-valve and contained in the central passage of the plunger, and operating devices connected with the said stem or rod and actuated by the movement of the plunger, substantially as described.

29. The combination with the plunger having a central passage through its lower portion, of the sleeve 112 applied to the said lower portion and rotatable thereon, means whereby to intermittingly rotate the said sleeve on the said lower portion, the block or anvil 3 applied to the lower end of the said sleeve, the clenching-block applied to the said block or anvil and having a discharge orifice or orifices 62 and a central chamber 61 with which the central passage of the plunger communicates, a check-valve within the said central chamber, a valve-operating rod within the said central passage of the plunger, and valve-operating devices connected with the said rod or stem and actuated by the movement of the plunger, substantially as described.

In testimony whereof I affix my signature in presence of two witnesses.

EUGENE H. TAYLOR.

Witnesses:
CHAS. F. RANDALL,
ALICE H. MORRISON.